Dec. 3, 1968  J. F. ADDOMS, JR., ET AL  3,413,704
METHOD OF MAKING COMPOSITE ULTRA-THIN METAL PLATELET HAVING
PRECISELY CONTROLLED PATTERN OF FLOW PASSAGES THEREIN
Filed Nov. 26, 1965

JOHN F ADDOMS JR
CHARLES B MCGOUGH
INVENTORS

BY Edward O Ansell
ATTORNEY

Albert J Miller
AGENT

United States Patent Office 3,413,704
Patented Dec. 3, 1968

3,413,704
METHOD OF MAKING COMPOSITE ULTRA-THIN METAL PLATELET HAVING PRECISELY CONTROLLED PATTERN OF FLOW PASSAGES THEREIN
John F. Addoms, Jr., Rancho Cordova, and Charles B. McGough, Fair Oaks, Calif., assignors to Aerojet-General Corporation, El Monte, Calif., a corporation of Ohio
Filed Nov. 26, 1965, Ser. No. 510,013
1 Claim. (Cl. 29—157)

ABSTRACT OF THE DISCLOSURE

This disclosure concerns a method of making a composite ultra-thin metal platelet having a precisely controlled pattern of flow passages therein. In practicing the method, a first metal layer of sheet stock which is of accurate thickness is provided with openings extending completely therethrough, the openings being formed by etching, stamping, or any other suitable procedure. A second metal layer is then provided with a controlled pattern of elevated and depressed areas on one surface by subjecting the second metal layer to a chemical etchant bath. The first and second metal layers are then bonded together in overlying relation to each other to comprise the metal platelet which has a pattern of flow passages formed therein including flow metering passages having a depth of extreme accuracy as determined solely by the thickness of the first metal layer and other flow passages whose depth is less critical.

---

Figure 1:
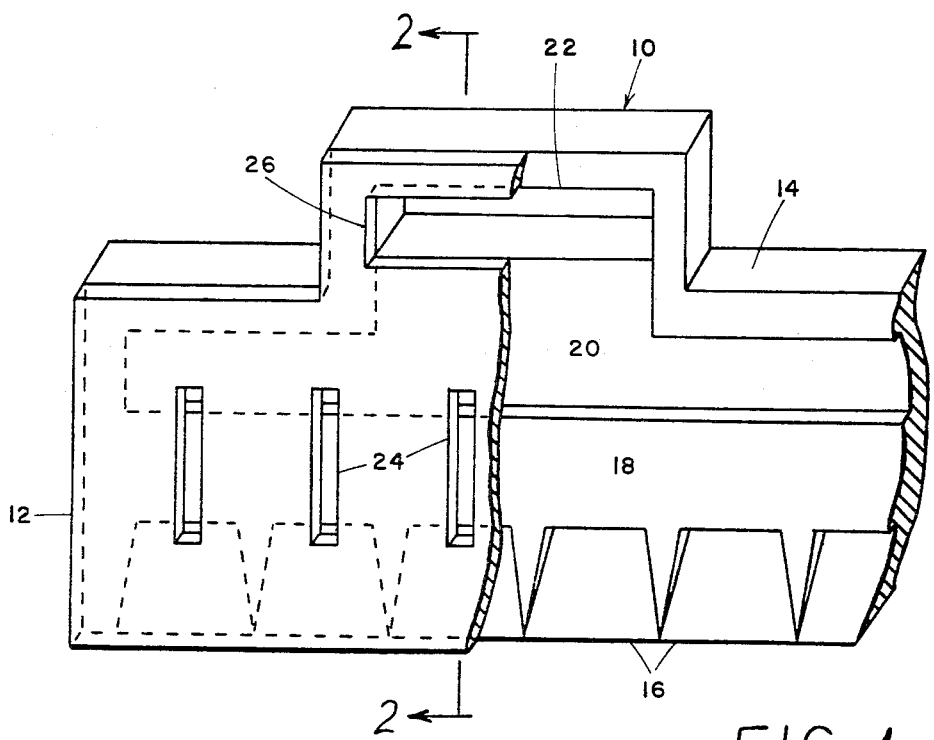

This invention relates to the manufacture of ultra-thin metal platelets, and has for its principal object the provision of such members having a precisely controlled pattern of fluid flow passages.

While ultra-thin metal members having fluid flow passages on the surface thereof have heretofore been known, one of the major problems encountered in the manufacture of various articles of hardware utilizing such members, hereinafter called platelets, has been the production of accurate, uniform, smooth, photoetched flow passages. Accurate dimensioning of such passages is necessary in achieving desired characteristics of fluid flow through such passages, and thereby assuring achievement of desired operating characteristics of the articles of hardware utilizing said platelets. With the use of conventional etching techniques, it is extremely difficult and costly to produce flow passages with the accuracy and degree of uniformity required. These difficulties arise due to the fact that the depth of etch obtained at any location on the work piece is a function of the etchant strength, etchant temperature, etchant spray characteristics, and homogeneity and grain structure of the work piece. Precise control of all these variables is required for uniform, accurate etching. To date, this required control has been extremely difficult to obtain. While alternate means of obtaining the precisely controlled pattern of elevated and depressed areas are available, such as selective plating or mechanical embossing, these too have their shortcomings.

In addition, certain applications of these platelets require that two depths of etch be achieved on a single platelet. An example of such an application is a liquid rocket engine injector of the type described in co-pending U.S. patent application, Ser. No. 489,970, filed Sept. 24, 1965. In the components of this device, there are a number of manifolds and plenums whose depth is not critical to the operation of the device and also a number of flow restrictions or flow control passages whose depth must be extremely accurately controlled. The present invention is most useful in providing these and other components for liquid rocket engine thrust chamber assemblies.

In the present invention, there is provided a method for obtaining accurate, reproducible-surfaced platelets, wherein the depth and uniformity control of the etching of critical flow passages thereon is independent of the entire etching process. As will be hereinafter described, in the present invention, the depth and uniformity of these critical flow passages are functions of the precision and uniformity of thin rolled sheet stock. Since it is well known that rolling can produce a highly uniform material, the present invention makes possible the production of etched flow passages on a platelet surface of a quality which is highly superior to that which can currently be produced with conventional etching or chemical milling techniques.

Figure 2:
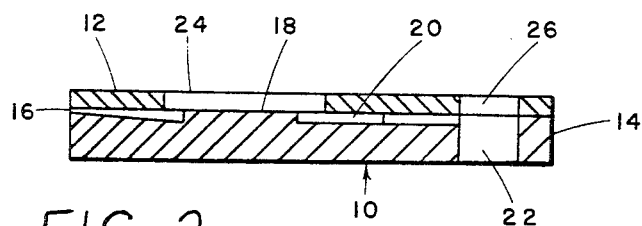

Other objects, aspects, features and advantages of the invention will be apparent to those skilled in the art from the following more detailed description, taken in conjunction with the appended drawing wherein:

FIG. 1 is a perspective view, partially broken away, of a layered article of manufacture produced by a method according to the present invention; and FIG. 2 is a cross-sectional view of the article of manufacture of FIG. 1 taken along line 2—2 of FIG. 1.

Referring now to the drawing, there is shown an article of manufacture in the nature of a platelet 10 having therein a precisely controlled pattern of fluid flow passages. The platelet comprises an upper layer 12 and a lower layer 14. The upper layer 12 is constructed of accurately rolled thin sheet stock and contains all flow metering passages which require extremely accurate depth. The lower layer 14 contains the manifold and plenum regions of the platelet 10 which do not require the same degree of preciseness as the metering passages.

The lower layer 14, typically 0.008 inch thick, contains a controlled pattern of elevated and depressed areas on one surface thereof. A number of these recessed areas open on one face or edge of the lower layer 14 and are referred to as isolation plenums 16. Separated from the isolation plenums 16 by a raised area 18, is a second recessed area called the distribution plenum 20. A manifold 22, which extends through the entire thickness of the lower layer 14, connects to the distribution plenum 20.

The upper layer 12 of the same configuration as the lower layer 14 and typically 0.002 inch thick contains a number of flow control or metering passages 24 which extend through the entire thickness of the layer. A control passage 24 extends between each isolation plenum 16 of the lower layer 14 and the distribution plenum 20 also of the lower layer 14 when the upper layer 12 is placed over the lower layer 14. The confines of the isolation plenums 16 and distribution plenum 20 are established by the recessed portions of the lower layer 14 and the back side of the upper layer 12. A manifold 26 in the upper layer 12 corresponds to the manifold 22 in the lower layer 14. While additional manifolds, plenums and passages may be included in either the upper or lower layer, those shown in FIGURES 1 and 2 are illustrative of a typical platelet.

The recessed and elevated portions of the lower plate 14 can be produced by etchant baths, the details of which are well known to those skilled in the art and are therefore not set forth in this application. If this is the process used to produce the recessed portions, then the material of the lower layer must be susceptible to etching in an acid bath, e.g., nickel in a hot nitric acid solution. By making all portions of the lower layer except those portions which are to be recessed and inserting the lower layer in the etchant bath, the unmasked portions will be rapidly etched to the desired depth after a predetermined length of time. Controls in the form of etchant strength and length of submergence can provide adequate precision for the non-critical flow passages, i.e., the isolation plenums 16 and distribution plenum 20. The manifold 22 can be etched completely through or otherwise produced.

The openings in the upper plate 12, i.e., the manifold 26 and flow control passages 24 can be either etched completely through or otherwise produced by conventional methods such as stamping. The depth of the flow passages 24 of the assembled platelet is independent of the method of manufacture, but depends entirely upon the thickness of the upper layer 12 which can be accurately controlled.

Assembly of the upper layer 12 with the lower layer 14 can be accomplished by merely aligning the two layers and clamping them together. It may be desirable, however, to bond the layers together, in which case, a braze material, such as copper, may be plated on the contiguous surface of one layer. Placing the assembled layers in a furnace at the proper temperature will bond the two layers together. In the same manner, a number of platelets, each consisting of two layers can be assembled.

In operation, a fluid flow will be directed through the manifold 22–26 of the assembled platelets 10. The flow will proceed into the distribution plenums 20 of the individual platelets 10. The flow control passages 24 will meter the flow into the isolation plenums 16 from which it will be dispensed. The depth of the upper layer 12 which is accurately maintained insures the required control over the type of flow (laminar) through the control passages 24 and the pressure drop therethrough.

It is to be understood that the form of the invention herein described and shown is to be taken as a preferred example of the same and that various changes in the shape, size, and arrangement of the parts or steps of the process may be resorted to without departing from the spirit of the invention and the scope of the appended claim.

What is claimed is:

1. A method of making a composite member having a precisely controlled pattern of flow passages therein comprising the steps of: producing at least one opening through the entire thickness of a first layer of material whose thickness is accurately controlled, masking a portion of the surfaces of a second layer of material in a predetermined pattern to make said portion impervious to an etchant bath, subjecting said second layer of material to an etchant bath until the etchant bath has removed the unmasked portions of said second layer of material to a predetermined depth to produce a precisely controlled pattern of elevated and depressed areas on at least one surface of said second layer of material, and joining said first layer of material with said second layer of material such that the opening through said first layer of material is positioned in communicating relation with a depressed area on said one surface of said second layer of material, thereby forming a unitary structure which includes a flow metering passage defined by the opening through said first layer of material and having a depth of extreme accuracy as determined solely by the thickness of the first layer of material and at least one other flow passage whose depth is less critical defined by the opposed surfaces of the first and second layers of material wherein the surface of said second layer of material has the pattern of elevated and depressed areas etched thereon.

References Cited

UNITED STATES PATENTS

| 944,440 | 12/1909 | Ionides | 239—555 |
| 2,273,830 | 2/1942 | Brierly et al. | 29—157 |
| 2,484,123 | 10/1949 | Schere | 239—555 X |
| 2,657,899 | 11/1953 | Köhler et al. | |
| 2,793,421 | 5/1957 | Brumbaugh | 29—157 |
| 2,828,532 | 4/1958 | Taylor | 29—157 |
| 3,022,743 | 2/1962 | Engholdt | 29—157 |
| 3,334,401 | 8/1967 | Hopkinson | 29—157 |

CHARLIE I. MOON, *Primary Examiner.*

PAUL M. COHEN, *Assistant Examiner.*